United States Patent
Smith et al.

(10) Patent No.: US 6,430,313 B1
(45) Date of Patent: Aug. 6, 2002

(54) USING A MINIMAL NUMBER OF PARAMETERS FOR CORRECTING THE RESPONSE OF COLOR IMAGE SENSORS

(75) Inventors: Ronald D. Smith, Phoenix; Edward J. Bawolek, Chandler, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/151,367

(22) Filed: Sep. 10, 1998

(51) Int. Cl.$^7$ ................................................ G06K 9/00
(52) U.S. Cl. ........................................ 382/167; 382/162
(58) Field of Search ................................ 382/162, 163, 382/164, 165, 166, 167, 168, 169, 170, 171; 348/221, 222, 265, 266, 267, 268, 272, 273, 274, 275, 280, 281, 282, 223; 358/513, 514, 518, 523, 530

(56) References Cited

U.S. PATENT DOCUMENTS

| | | | | |
|---|---|---|---|---|
| 5,420,979 A | * | 5/1995 | Madden et al. | 395/162 |
| 5,633,953 A | * | 5/1997 | Kouzaki | 382/167 |
| 5,668,596 A | * | 9/1997 | Vogel | 348/222 |
| 5,805,213 A | * | 9/1998 | Spaulding et al. | 348/222 |
| 5,818,525 A | * | 10/1998 | Elabd | 348/268 |
| 5,828,781 A | * | 10/1998 | Nakano | 382/167 |
| 5,917,556 A | * | 6/1999 | Katayama | 348/655 |
| 6,008,912 A | * | 12/1999 | Sato et al. | 358/518 |
| 6,028,913 A | * | 2/2000 | Meulenbrugge et al. | 378/98.8 |
| 6,124,882 A | * | 9/2000 | Voois et al. | 348/407 |
| 6,125,199 A | * | 9/2000 | Sato et al. | 382/162 |

* cited by examiner

*Primary Examiner*—Phuoc Tran
*Assistant Examiner*—Amir Alavi
(74) *Attorney, Agent, or Firm*—Blakely, Sokoloff, Taylor, & Zafman

(57) ABSTRACT

Methods for generating a set of parameters and an associated methodology that model a portion of the variation in a number of sensor-specific correction matrices. The parameters are fewer than the number of elements in one of the sensor-specific correction matrices yet adequately model variations in the IC manufacturing process used to fabricate color image sensors. Storage circuitry aboard an IC die containing the sensor can be configured to store the parameters.

22 Claims, 6 Drawing Sheets

USING A MINIMAL NUMBER OF PARAMETERS FOR CORRECTING THE RESPONSE OF COLOR IMAGE SENSORS

BACKGROUND INFORMATION

1. Field of the Invention

This invention is generally related to imaging systems and more particularly to correcting for deviations in the response of manufactured color image sensors.

2. Related Art

Sensors that respond to incident electromagnetic radiation are used in a wide range of applications, from the simple infrared photodetector used in home security systems for detecting intruders to complex medical imaging applications. One particular type of sensor is the image sensor used for capturing images of scenes. Image sensors are used in consumer products such as video cameras, scanners, copiers, and, more recently, digital cameras which provide digital images in a computer-readable format that are manipulated and displayed by a host processing system such as a personal computer (PC). To detect color, image sensors are equipped with color filters that allow the sensor to respond to different colors in the scene.

Processing of color images is typically achieved using the following mathematical construct. The digital image is defined as a collection of vectors where each vector has several pixel value components generated by the sensor. For instance, in RGB imaging, each vector contains Red, Green, and Blue components that together define the color at a given location in the image. Each color is thus analogous to a point defined by 3 components in a 3-dimensional cartesian coordinate space. The same color (point) can, however, be represented using different color models (coordinate spaces). For instance, a color defined by an RGB vector can also be defined by an XYZ vector, where the XYZ vector is a linear combination of three vectors in the XYZ color space as defined by the industry standard CIE (Commission Internationale de l'Eclairage). This ability to represent the same color using different color models is advantageous because certain imaging applications are designed to work with a particular set of colors. For instance, many graphics software programs manipulate images in the XYZ color space, whereas many sensors generate RGB pixel values (where RGB is said to be the énative color spaceí of the image sensor).

The translation between two color spaces can be achieved with known linear algebra techniques. A vector s in one color space can be multiplied by a color transformation matrix $\tilde{K}$ yield the corresponding vector d (pointing to the same point or color) in the desired color space.

$$d = \tilde{K}s \quad (1)$$

Standard transformation matrices have been developed for transformation between many different fundamental color spaces, including for example CMY (Cyan, magenta, Yellow) to XYZ or RGB to XYZ.

The transformation matrix technique has also proved to be useful in calibrating color imaging systems to correct for deviations in sensor response due to non-idealities such as manufacturing process variations. For calibration purposes, the elements of a transformation matrix $\tilde{K}$ are replaced with values that are specific to a manufactured image sensor used in the imaging system. This yields a "calibrated" transformation matrix $\tilde{K}_{sensor}$ where $$d = \tilde{K}_{sensor} s \quad (2)$$

$\tilde{K}_{sensor}$ is obtained by solving equation (2) using techniques known in the art, where s is the actual (or measured) response of an imaging system (in the native color space) to known color stimuli, and d is the expected response in the desired color space. The expected response d is based on design criteria used in manufacturing the sensor and in particular the color filters used in the sensor.

The elements of $\tilde{K}_{sensor}$ are typically stored in a non-volatile memory associated with the corresponding sensor and provided to the developer of the imaging system who applies the matrix to each vector of pixel values in a captured image to obtain a corrected and therefore more accurate image in the desired color space.

A problem, however, arises when attempting to store the elements of $\tilde{K}_{sensor}$ for sensors fabricated using certain technologies such as a standard complimentary metal oxide semiconductor (CMOS) logic fabrication process. Fabricating a non-volatile storage area on a CMOS logic die normally requires a substantial increase in the size of the die and/or significant deviations from the standard fabrication process. These problems are aggravated when there are a large number of precision values that need to be stored, e.g., a sensor with native color space having three base colors requires nine high-precision values, corresponding to the nine elements of the 3×3 matrix $\tilde{K}_{sensor}$.

To avoid having to increase the die size of a CMOS sensor and/or deviate from standard manufacturing processes, the elements of $\tilde{K}_{sensor}$ can be stored external to the sensor die. This, however, forces the sensor manufacturer to provide the calibration information separate from the sensor itself via a floppy disk, additional die, or some other separate storage media, when each sensor is shipped to the system developer. Use of a separate storage element in this way becomes a significant burden when shipping a large number of sensors.

Therefore, a more efficient technique of representing calibration information of image sensors for easier storage in the sensor die is needed.

SUMMARY

In one embodiment of the invention, a method is provided for generating a set of parameters and an associated methodology that model a portion of the variation in a number of sensor-specific correction matrices, the parameters being fewer than the number of elements in one of the sensor-specific correction matrices.

Additional features and benefits of the invention will become apparent from the detailed description, figures, and claims set forth below.

DETAILED DESCRIPTION OF THE INVENTION

Figure 1:
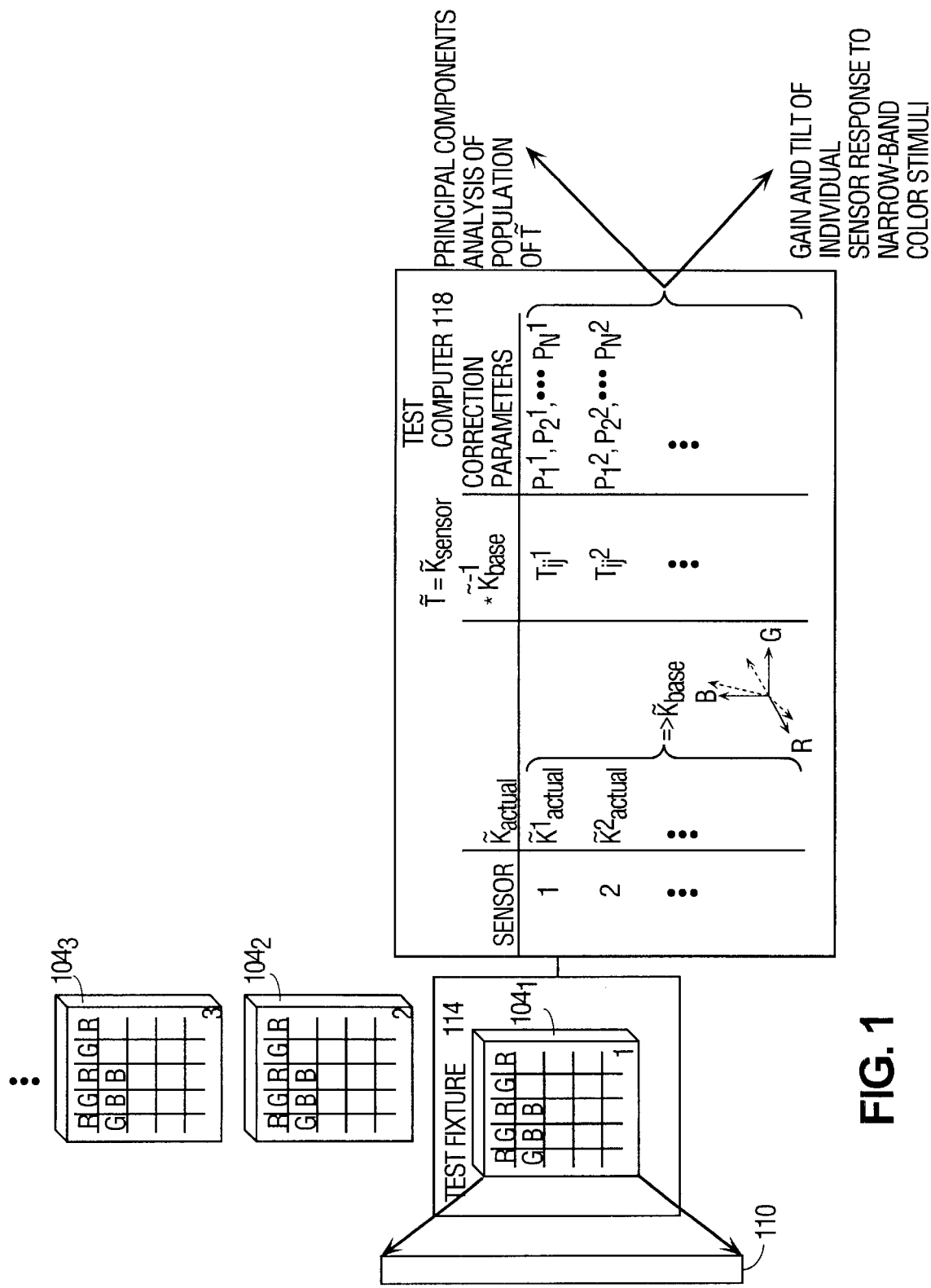
FIG. 1 illustrates a block diagram of a system for determining a minimal number of correction parameters according to an embodiment of the invention.

The above briefly summarized embodiment of the invention as well as other embodiments described in detail below exploit the observations that (1) some of the variations in the response of color image sensors are highly correlated, such that knowledge of one permits making a good guess as to the other, and (2) the response of a number of image sensors manufactured using a given process can be characterized by small deviations from a base response, where the base response is one that would be provided by, for example, a hypothetical image sensor having nominal physical characteristics and manufactured using the same process. Using the different techniques described below, a smaller amount of sensor-specific calibration information than the conventional matrix $\tilde{K}_{sensor}$ can be determined and stored aboard each sensor die. Process characterizing information is extracted from statistical sensor response data and can be provided to the system developer separate from the sensor-specific information to complete the calibration. This avoids having to substantially increase the size of the die or substantially alter the fabrication process when associating calibration information with each sensor.

In one embodiment of the invention, the conventional matrix $\tilde{K}_{sensor}$ for a specific manufactured sensor is factorized into a base matrix $\tilde{K}_{base}$ and a correction matrix $\tilde{T}$ where $$\tilde{K}_{sensor} = \tilde{T} \tilde{K}_{base} \quad (3)$$

$\tilde{K}_{base}$ represents the transformation and correction to be applied to a base response. The base response may be from a hypothetical base image sensor having, in one embodiment, nominal physical characteristics in view of a target manufacturing process. The base response may be obtained from statistical process measurements made on a population of sensors and may be the center point of the measured sensor population. $\tilde{T}$ corrects for deviations in the response of a specific manufactured sensor from of the base response. $\tilde{T}$ may be obtained by multiplying $\tilde{K}_{sensor}$ by the inverse of $\tilde{K}_{base}$, where the assumptions are made that $\tilde{K}_{sensor}$ for each sensor differs from $\tilde{K}_{base}$ by a factor $\tilde{T}$ and that $\tilde{K}_{base}$ is invertable, i.e.

$$\tilde{T} = \tilde{K}_{sensor} \tilde{K}_{base}^{-1} \quad (4)$$

The elements of $\tilde{T}$ are then represented in compact form by a minimal number of correction parameters normally stored in non-volatile storage aboard each sensor die. When operating an imaging system built using this sensor die, the parameters are read and combined with the process characterizing information to yield $\tilde{T}$. This process information is the same for a group of manufactured sensor dies and may thus be provided separately from each sensor die. For instance, the process information may be part of imaging software provided by the manufacturer of a digital camera, where the software is to be executed by a host processing system on which image data is to be displayed.

FIG. 1 illustrates a system for obtaining a minimal number of correction parameters and associated process information according to an embodiment of the invention. The system features a test fixture 114 that gathers sensor response data from a number of manufactured image sensors 104$_1$, 104$_2$ . . . (104$_i$). Each image sensor 104$_i$ may be part of an IC die having additional signal and/or image processing functions, or may be part of a printed wiring board such as an imager module. The gathering of sensor response data may be performed during wafer sort or final package test. As an alternative to receiving the IC die on a module, the test fixture 114 may be configured to accept an imaging apparatus (such as a digital camera) that contains the sensor 104$_i$. One of ordinary skill in the art will recognize that a wide range of test configurations may be used that allow sensor response to different color stimuli to be measured.

To obtain sensor response data, each sensor 104$_i$ is in turn illuminated with known color stimuli using, for instance, a color chart 110. The responses of a number of sensors 104$_i$ are collected by a test computer 118. With reference to the flow diagram of FIG. 3, and beginning with step 304, the measured sensor responses are processed by the test computer 118 to generate statistical data for a group of sensors manufactured using a target process. A color transformation matrix $\tilde{K}_{sensor}$ is computed in step 304 for each sensor in the group. This can be done using well known combinations of empirical and analytical techniques.

Operation continues with step 308 in which the matrix $\tilde{K}_{base}$ is computed. In one embodiment, $\tilde{K}_{base}$ is designed to compensate for the effects of normal variations in the target manufacturing process. $\tilde{K}_{base}$ may be computed using known techniques in the art, such as statistical mean square error minimization or maximum likelihood determination as applied to either measured or simulated sensor performance, and techniques disclosed in "*Calibration of a Video Camera Digitizing System in the CIE L\*U\*V ColourSpace*", by N. J. C. Strachan, P. Nesvadba, and A. R. Allen, *Pattern Recognition Letters* 11 (1990), pp. 771–777. Operation continues with step 312.

In step 312, the matrix $\tilde{T}$ is computed for each of the sensors 104$_i$ in the group, based on $\tilde{T} = \tilde{K}_{sensor} \tilde{K}_{base}^{-1}$. It can be seen that the elements of $\tilde{T}$ are specific to a given manufactured sensor. These elements will be represented in more compact form by a minimal number of parameters $P_1$, $P_2$, . . . $P_N(P_n)$ where N is smaller than the number of elements in $\tilde{T}$. In certain instances, $P_n$ also have fewer significant digits than the elements of $\tilde{T}$, thus making the $P_n$ representation even more compact. The $P_n$ and the associated process characterizing information, in one embodiment of the invention, are determined according to the flow diagram of FIG. 3. In another embodiment of the invention, the $P_n$ and process information are computed as in FIG. 5 to be discussed below.

Figure 2:
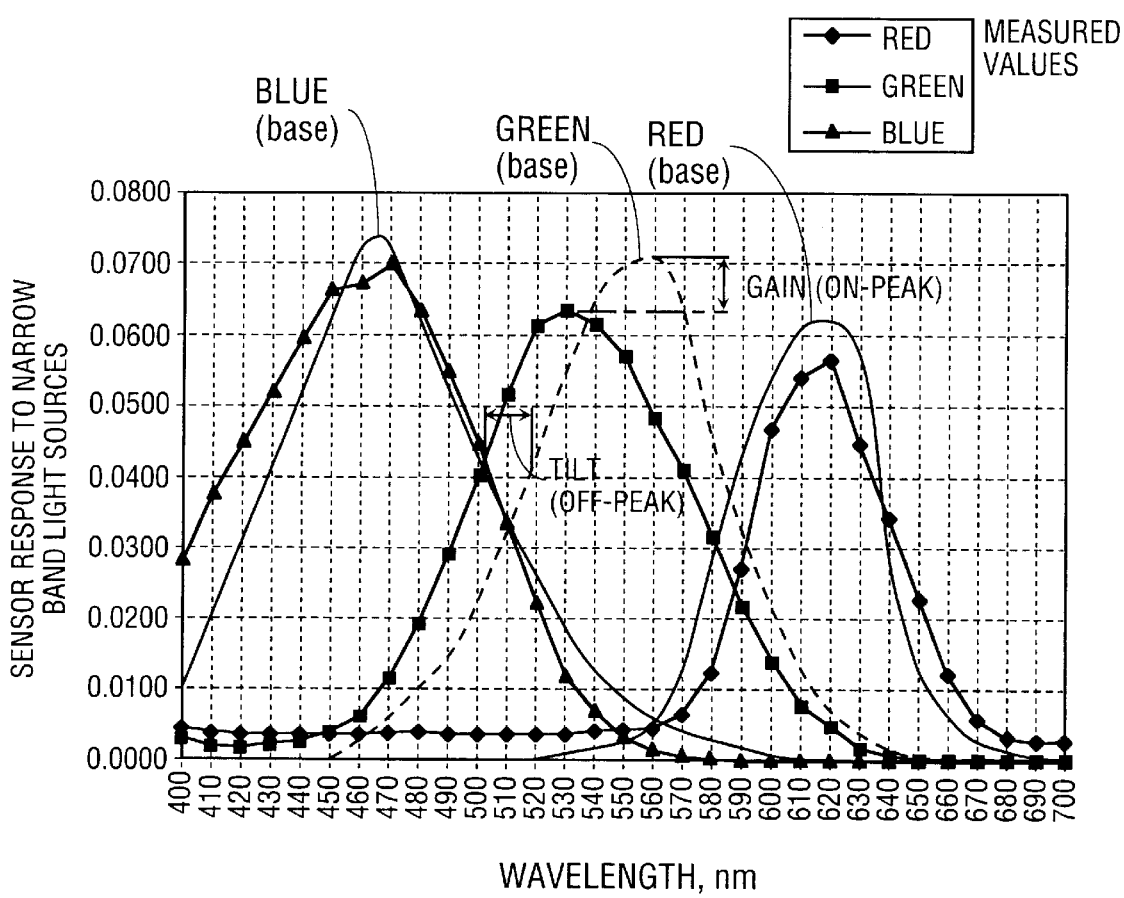
FIG. 2 is a plot of the response of a color image sensor to narrow band color stimuli used in one embodiment of the invention.
Figure 3:
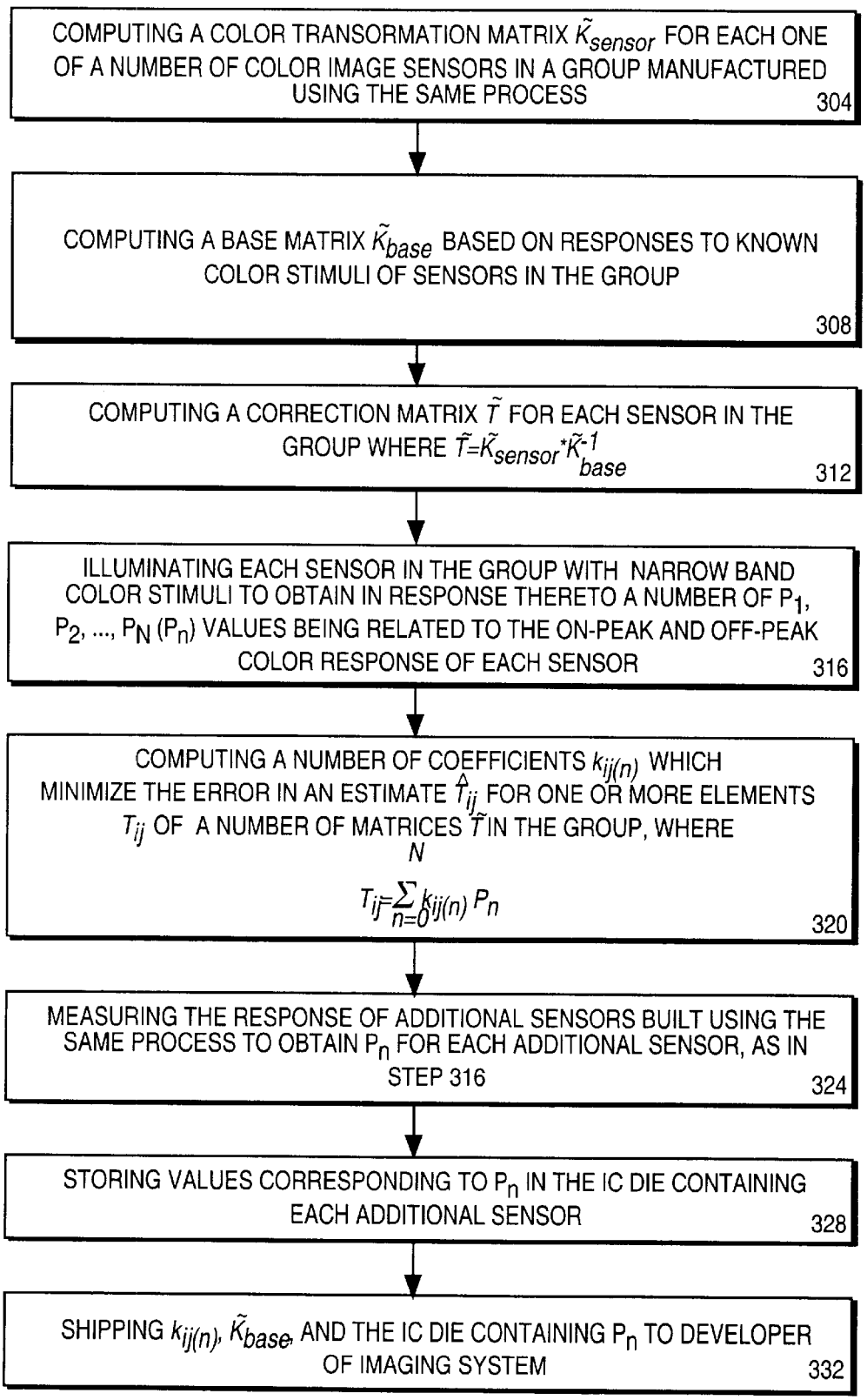
FIG. 3 is a flow diagram of operations performed in obtaining correction parameters according to an embodiment of the invention.

In step 316 of the embodiment of FIG. 3, each sensor in the group is illuminated with narrow band color stimuli to obtain in response thereto a number of measured responses as shown in FIG. 2. FIG. 2 also shows the base response. The correction parameters $P_n$ are, in one embodiment, the gain and tilt variations shown, for each color R, G, and B in the sensoris native color space.

There are a number of possible variations in semiconductor IC manufacturing processes that can cause the gain and tilt variations shown in FIG. 2. It has been observed that such variations in the response may be due to variances in the sensoris color filters, namely in the dye concentration, the relative concentrations of various dyes, the thickness of the applied polymer layers, the base color of the cured carrier material, as well as others. To compensate for such variations, one embodiment of the invention uses six correction parameters $P_n$ that represent the gain (on-peak) and tilt (off-peak) sensor response to each of R, G, and B stimuli as shown in FIG. 2. In one embodiment, the six parameters $P_n$ are absolute values of sensor response at six different wavelengths (on-peak and off-peak responses for each of the three color R, G, and B). Alternatively, the six correction parameters may be differences between the response of the particular manufactured sensor being tested and the base response.

The gain and tilt correction parameters can be defined in various ways. For instance, the gain correction parameter for each color may be defined as the difference between the base and the measured response data at a wavelength which is expected to yield the peak responsivity value from the base sensor. The tilt parameter may be defined as the difference in wavelength between the base and measured data, at a response level expected from the base sensor. The tilt can be viewed as a sideways shift or distortion in the response curve, while the gain represents a vertical one. Viewed yet another way, the gain parameters may represent scaling along each axis of the RGB color space coordinate system, whereas each of the tilt parameters represents an "off-axis" correction, such as a small rotation of the coordinate system about a given axis.

Returning to the flow diagram of FIG. 3, once the sensor responses and parameters $P_n$ have been measured, operation continues with step 320 where the parameters $P_n$ are correlated with previously computed elements of correction matrices $\tilde{T}$. This may be done using, for instance, linear regression to obtain a number of coefficients $k_{ij(n)}$ in equation set (5) below. The $k_{ij(n)}$ together with $\tilde{K}_{base}$ become part of the process characterizing information that is common to sensors built using the same manufacturing process. The equation set (5) below defines, in one embodiment of the invention, the relationship between elements $T_{ij}$ in $\tilde{T}$ and their estimates $\hat{T}_{ij}$ obtained by a linear combination of $k_{ij(n)}$ and $P_n$ for a group of M sensors.

$$\left.\begin{array}{l} T_{11}^1 : \hat{T}_{11}^1 = \sum_{n=0}^{N} k_{11(n)} P_n^1 \\ T_{11}^2 : \hat{T}_{11}^2 = \sum k_{11(n)} P_n^2 \\ \vdots \\ T_{11}^M : \hat{T}_{11}^M = \sum k_{11(n)} P_n^M \end{array}\right] \quad (5)$$

$$\left.\begin{array}{l} T_{12}^1 : \hat{T}_{12}^1 = \sum_{n=0}^{N} k_{12(n)} P_n^1 \\ T_{12}^2 : \hat{T}_{12}^2 = \sum k_{12(n)} P_n^2 \\ \vdots \\ T_{12}^M : \hat{T}_{12}^M = \sum k_{12(n)} P_n^M \end{array}\right]$$

$$\vdots$$

The $k_{ij(n)}$ are used during sensor calibration (discussed below) to recover the matrix $\tilde{T}$ by computing an estimate of $\tilde{T}$ based on equation set (5) and the gain and tilt parameters $P_n$ for the particular sensor.

Once $k_{ij(n)}$ have been computed for a group of sensors built using the target manufacturing process, they can be applied to calibrate additional sensors built using the target process. To complete the calibration information needed for the additional sensors, only the six gain and tilt parameters $P_n$ need be measured for each additional sensor, as indicated in step 324. The $k_{ij(n)}$ and $\tilde{K}_{sensor}$ need not be computed for each additional sensor.

Figure 4:
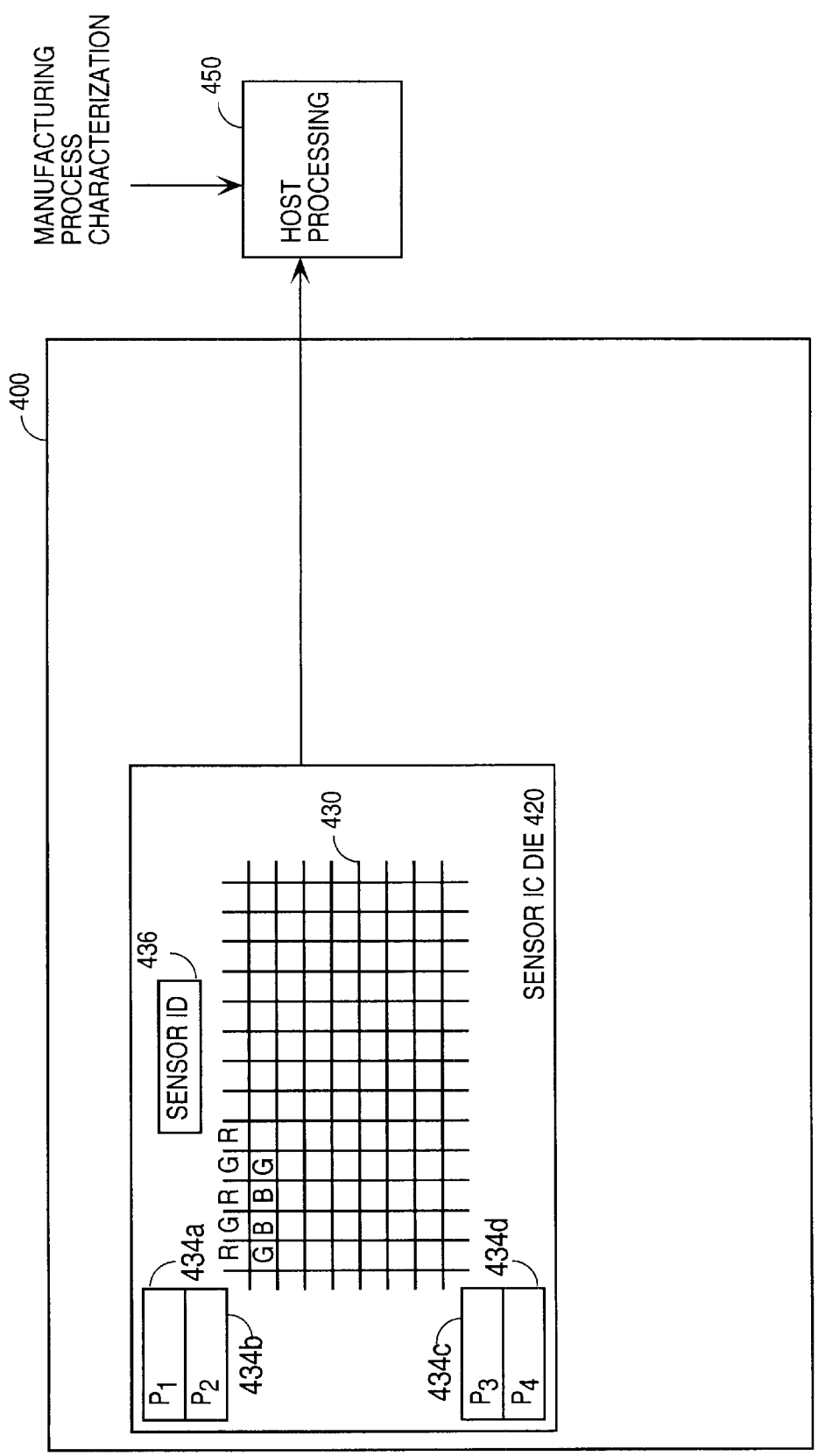
FIG. 4 is a block diagram of an imaging apparatus configured with correction parameters according to an embodiment of the invention.

The calibration information $P_n$ associated with each specific sensor is normally provided to the developer of an imaging apparatus 400 such as a digital camera, as in FIG. 4. In one embodiment, digital values corresponding to $P_n$ are stored in storage areas 434a, b, c, and d in an IC die 420. The die 420 also contains an array 430 of photocells that form the sensor. The die 420 may also be assigned an identification (ID) code 436. The process characterizing information comprising $\tilde{K}_{base}$, the coefficients $k_{ij(n)}$, and the equation set (5) are associated with this ID code and provided to the host processing system 450, as in step 332 in FIG. 3.

The needed number of bits to cover the entire range of $P_n$ depends on the variation exhibited by the parameters of the sensor manufacturing process. Process parameters that are typically subject to substantial variation include the composition and ratios of die in the color filter array (CFA) and the thickness of the CFA. If a particular process parameter suffers from a wide variation, i.e., its measured or actual value varies substantially from the theoretical or design value, then a greater number of bits may be needed to encode one or more of the $P_n$ in order to adequately represent the wide variation. In addition, a non-linear relationship between the stored bits and the actual $P_n$ values may be defined to achieve a type of compression in storing the $P_n$. Yet another alternative may be to actually store pointers in the sensor die that point to locations in a table of $P_n$ values, where the $P_n$ in the table can be used to describe a number of sensors. The table could be stored outside the sensor dies. Of course, another solution to the problem of wide variance would be to more carefully tune the manufacturing process to yield smaller variations. The embodiments of the invention, however, allow the sensor manufacturer to forego such a costly tuning process. Instead, the wider variation may be corrected using the parameters $P_n$ to estimate the correction matrix $\tilde{T}$ and then recover the color transformation matrix $\tilde{K}_{sensor}$ using equation (3).

Figure 5:
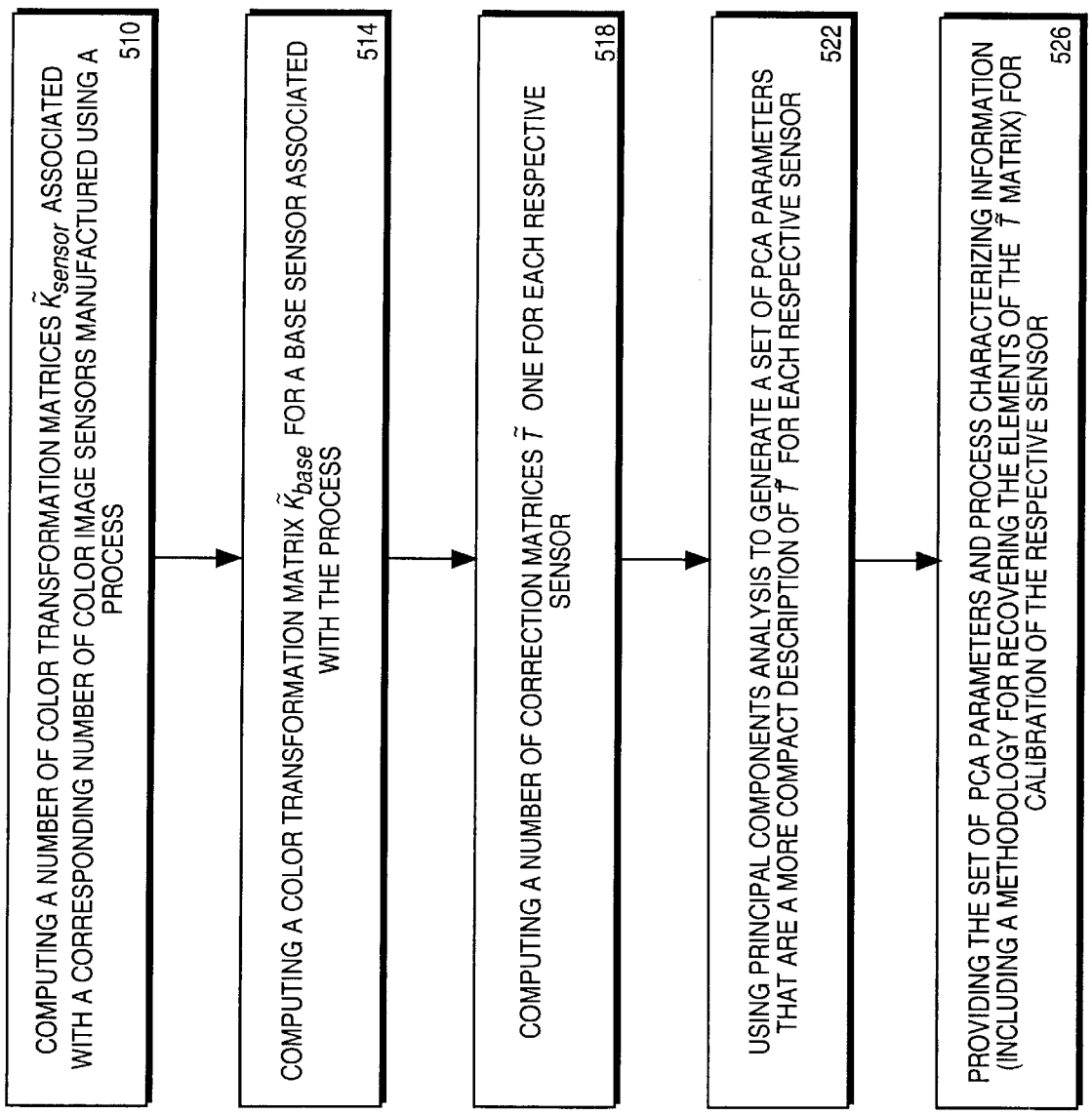
FIG. 5 illustrates a flow diagram of operations performed in obtaining a minimal number of correction parameters according to another embodiment of the invention.

FIG. 5 illustrates a flow diagram of another technique for computing a minimal number of correction parameters $P_n$, according to another embodiment of the invention. Operation may begin with step 510 where a number of color transformation matrices $\tilde{K}_{sensor}$ associated with a corresponding number of color image sensors in a sample group manufactured using a target process are computed. Operation continues with step 514 in which a base matrix $\tilde{K}_{base}$ is determined and associated with the target process. These two steps may be accomplished according to known techniques in the art, and in particular those discussed above in connection with steps 304 and 308 of the embodiment in FIG. 3. Operation then continues with step 518.

In step 518, a correction matrix $\tilde{T}$ is computed for each sensor to be shipped. This may be done in one of at least two ways. First, $\tilde{T}$ may be computed according to equation (4) where the sensor is tested to compute its corresponding $\tilde{K}_{sensor}$ according to known techniques in the art. Alternatively, $\tilde{T}$ may be estimated according to equation (5) without having to compute $\tilde{K}_{sensor}$, by performing step 316 of FIG. 3 to determine the gain and tilt parameters for the sensor, and then computing the estimated $\tilde{T}$ in step 320 using the coefficients $K_{ij(n)}$ which have been previously computed based on the $\tilde{K}_{sensor}$ matrices of the sample group. In either case, a population of matrices $\tilde{T}$ are computed for a number of image sensors manufactured using the target process. Operation then proceeds with step 522 in FIG. 5.

In step 522, the population of the $\tilde{T}$ matrices is analyzed using principle components analysis (PCA) to determine the required number of variables needed to model a predefined portion of the variance in the population of $\tilde{T}$ matrices. PCA is a statistical technique falling under the general title of factor analysis, where the purpose is to obtain a compact description of a multivariate stochastic observation. For further details, see the textbook *Principle Component Neural Networks—Theory and Applications,* K. I. Diamantaras and S. Y. Kung, John Wiley and Sons (1996), at pp. 44–72.

The PCA has been performed on simulated 3×3 $\tilde{T}$ matrices derived from color materials and sensor response characteristics having +/−5% (1σ) variation in peak response and peak wavelength. These results of the PCA show that four variables can account for more than 95% of the variance in the matrices. Fewer variables accordingly account for a lower percentage of the variance, whereas six variables can account for virtually all of the variance (greater then 99%) in the matrices.

Once the required number of variables are determined, a set of eigenvectors can be computed for the population of sensors according to the techniques discussed generally in the Diamantaras text. The eigenvectors are then used to determine a set of correction parameters for a particular sensor. The parameters are determined according to equation (6) where $$y = Ax \qquad (6)$$

in which y is a column vector containing the correction parameters, x is a column vector containing the elements of matrix $\tilde{T}$ for the particular sensor, and A is a matrix determined based on the eigenvectors. For instance, in RGB imaging, x is a 9×1 column vector containing the 9 values of the matrix $\tilde{T}$. If the number of variables selected is 4, then y is a 4×1 column vector containing the 4 parameters to be determined. The matrix A is a 4×9 matrix containing eigenvector values.

To recover the matrix $\tilde{T}$, the following equation is applied:

$$x = A_y^T \qquad (7)$$

where $A^T$ is the transpose of the matrix A introduced above.

The complete calibration information associated with the particular sensor is therefore the set of PCA parameters x, the matrix A of eigenvectors, equation (7), and the base matrix $\tilde{K}_{base}$. All except the PCA parameters can be part of the process characterizing information that may be supplied to the developer of imaging systems as in step 526.

Figure 6:
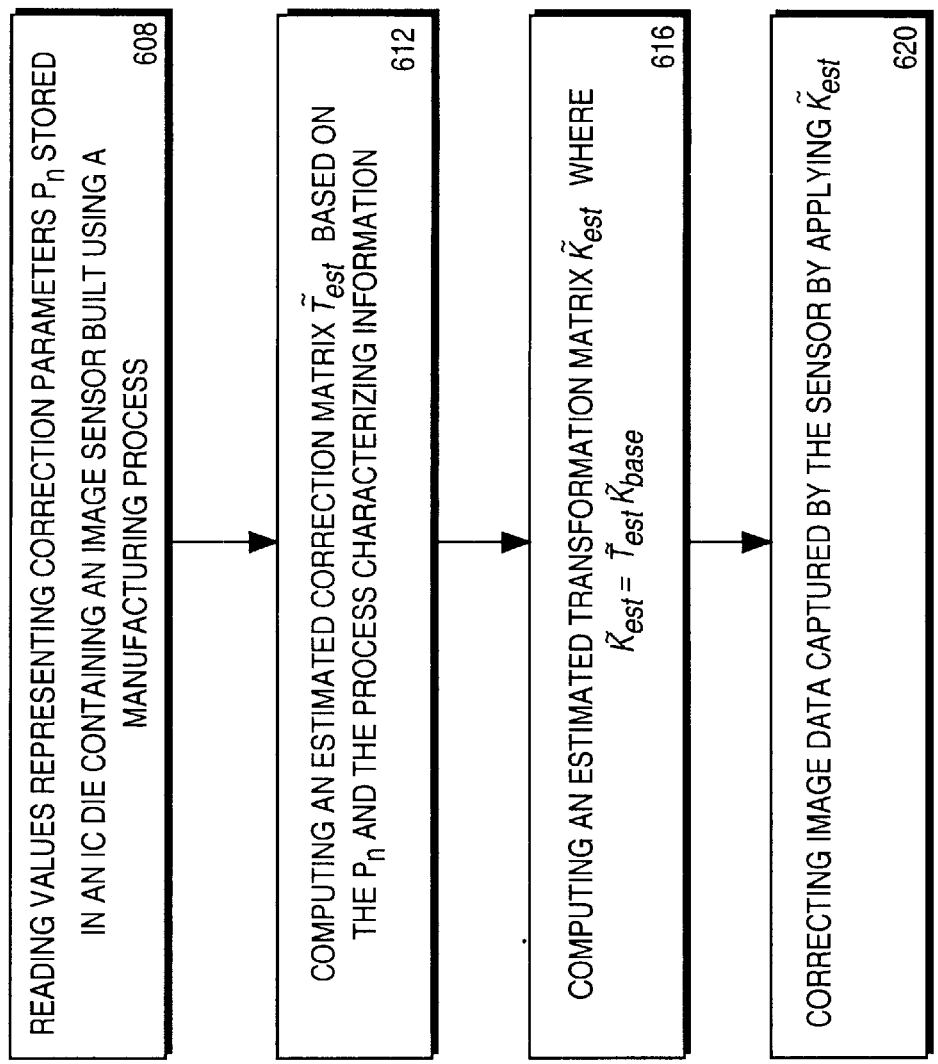
FIG. 6 shows a flow diagram for applying the correction parameters to calibrate an imaging system according to an embodiment of the invention.

An imaging apparatus such as a digital camera with the sensor die bearing a minimal number of correction parameters $P_n$ can be calibrated using the steps in FIG. 6. Beginning with step 608, values representing the correction parameters $P_n$ are read from a storage area aboard the sensor die 420. As described above, the $P_n$ may be gain and tilt parameters or they may be PCA parameters.

An estimated correction matrix $T_{est}$ is computed in step 612 using $P_n$ and process characterizing information. If $P_n$ are gain and tilt parameters, then $k_{ij(n)}$ and equation set (5) are used to recover $\tilde{T}$. Alternatively, if PCA were used to model the variations in the sensor population, then equation (6) is used together with the PCA eigenvectors. In either case, operation continues with step 616 in which an estimated transformation matrix $\tilde{K}_{est}$ is computed using equation (3). The $\tilde{K}_{est}$ can then be used to correct image data captured by the sensor, as indicated in step 620 and in accordance with equation (2).

The correction made by computing and applying $\tilde{K}_{est}$ can be done aboard the imaging apparatus 400 prior to transferring corrected image data to the host processing system 450. Alternatively, the uncorrected image data together with the sensor ID and parameters $P_n$ can be transferred to the host system 450 where software in the host system computes $\tilde{K}_{est}$. The $P_n$ are read from the die 420, while the process characterizing information is part of host software. Other applications for performing the correction by combining $P_n$ and the process characterizing information can be developed by those of ordinary skill in the art, for instance using a digital photography kiosk as the host system to calibrate the raw image data being downloaded from a digital camera before preparing a hard copy.

In the foregoing specification, the invention has been described with reference to specific embodiments. It will, however, be evident that various modifications and changes can be made thereto without departing from the broader spirit and scope of the invention as set forth in the appended claims. For instance, imaging systems other than digital cameras are contemplated which may benefit from the various embodiments described, such as video cameras, videoconferencing cameras, color copiers and scanners. The specification and drawings are, accordingly, to be regarded in an illustrative rather than a restrictive sense. The scope of the invention should be interpreted by the appended claims.

What is claimed is:

1. A method comprising:
   generating a first matrix to correct the response of a reference image sensor associated with an image sensor manufacturing process, based on measured responses to color stimuli of a plurality of image sensors built using the process;
   generating a plurality of sensor-specific correction matrices that correct for deviations in the responses of the plurality of image sensors, respectively, from that of the reference image sensor, each sensor-specific correction matrix being a product of a separate second matrix and an inverse of the first matrix; and
   generating a set of parameters that model variation among corresponding elements of the plurality of sensor-specific correction matrixes.

2. The method of claim 1 wherein the first matrix is a base color transformation matrix $K_{base}$, and wherein each separate second matrix is a color transformation matrix $K_{sensor}$ that is specific to each of the plurality of image sensors.

3. The method of claim 2 further comprising determining the number of parameters in the set required to model a predefined portion of the variation as being fewer than the number of elements in a sensor-specific correction matrix.

4. The method of claim 2 wherein the step of generating the plurality of sensor-specific correction matrices comprises
   computing each of the sensor-specific correction matrices using $T = \tilde{K}_{sensor} \tilde{K}_{base}^{-1}$.

5. An imaging device comprising: storage circuitry for storing a plurality of parameters for modeling the elements of a correction matrix $\tilde{T}$, $\tilde{T}$ and a base matrix $\tilde{K}_{base}$ being factors of a color transformation matrix $\tilde{K}_{sensor}$ used to adjust pixel data derived from an image sensor built using an IC manufacturing process, wherein $\tilde{T}$ is proportional to a product of $\tilde{K}_{sensor}$ and $\tilde{K}_{base}^{-1}$, and the parameters are fewer than the number of matrix elements in $\tilde{K}_{sensor}$.

6. The imaging device of claim 5 further comprising
   a plurality of sensor cells being electrically responsive to light to provide signals from which the pixel data are derived, the sensor cells and the storage circuitry being disposed in the same integrated circuit (IC) die.

7. The imaging device of claim 5 wherein the parameters are obtained by performing principal components analysis (PCA) on statistical sensor response data obtained from the image sensor and a plurality of other sensors built using the IC manufacturing process.

8. The imaging device of claim 5 wherein the storage circuitry provides for non-volatile storage of the parameters.

9. The imaging device of claim 5 wherein the parameters comprise gain and tilt values for the image sensor.

10. The imaging device of claim 9 wherein the pixel data are derived from the image sensor having an R, G, and B color filter array, and wherein the color transformation matrix $\tilde{K}_{sensor}$ is further configured to translate the pixel data into XYZ pixel data.

11. A method of encoding correction information for a color image sensor, comprising:
  a) illuminating a first image sensor with known color stimuli to obtain in response thereto a first plurality of measured pixel values, the first sensor being manufactured as part of an integrated circuit (IC) die using a semiconductor fabrication process;
  b) computing a color transformation matrix $\tilde{K}_{sensor}$ associated with the first sensor;
  c) computing a base matrix $\tilde{K}_{base}$ based on responses to color stimuli of a plurality of image sensors built using the process;
  d) computing a correction matrix $\tilde{T}$ based on $\tilde{K}_{base}$ and $\tilde{K}_{sensor}$, where $\tilde{T}=\tilde{K}_{sensor}*\tilde{K}_{base}^{-1}$; and
  e) computing a plurality of coefficients $k_n$ which minimize the error in an estimate $\hat{T}_{ij}$ for an element $T_{ij}$ of the matrix $\tilde{T}$, the estimate $\hat{T}_{ij}$ being obtained by a linear combination of $k_n$ and $P_n$, where $P_n$ are related to the first measured pixel values.

12. The method of claim 11 further comprising:
  storing information corresponding to the plurality of $P_n$ in the IC die.

13. The method of claim 12 wherein the step of storing comprises storing a plurality of pointers in the IC die to the plurality of $P_n$.

14. A method as in claim 12 wherein the step of storing comprises storing the information in a non-volatile storage in the IC die.

15. A method of recovering correction information for a color image sensor, comprising:
  computing a first matrix based on a plurality of parameters and based on information that characterizes the IC manufacturing process used for fabricating the color image sensor, the parameters modeling a portion of the variation in a plurality of sensor-specific correction matrices for a population of color image sensors built using the manufacturing process, the parameters being fewer than the number of elements in one of the sensor-specific correction matrices;
  computing a second matrix based on the first matrix and based on said information that characterizes the IC manufacturing process, wherein the second matrix is proportional to a product of the first matrix and a third matrix that incorporates some of said information; and
  applying the second matrix for correcting image data captured by the image sensor.

16. The method of claim 15 wherein the second matrix is equal to a product of the first and third matrices.

17. The method of claim 15 wherein the parameters are obtained by performing Principal Components Analysis (PCA) upon the plurality of sensor-specific correction matrices, the information that characterizes the manufacturing process comprising a methodology and set of eigenvectors associated for computing the first matrix.

18. The method of claim 15 wherein the parameters include the gain and tilt of the color image sensor, and the information that characterizes the manufacturing process comprises a plurality of correlation coefficients for computing the first matrix.

19. An article comprising:
  a machine-readable medium having instructions that when executed by a processor cause
  computing a first matrix based on a plurality of parameters and based on information that characterizes the IC manufacturing process used for fabricating the color image sensor, the parameters modeling a portion of the variation in a plurality of sensor-specific color correction matrices, the parameters being fewer than the number of elements in one of the sensor-specific matrices;
  computing a second matrix based on the first matrix and based on said information that characterizes the IC manufacturing process, wherein the second matrix is proportional to a product of the first matrix and a third matrix that incorporates some of said information; and
  applying $\tilde{K}_{est}$ for correcting image data captured by the image sensor.

20. The article of claim 19 wherein the machine-readable medium comprises instructions that when executed by the processor cause computing the second matrix as equal to a product of the first and third matrices.

21. The article of claim 19 wherein the machine-readable medium comprises instructions that when executed cause the parameters to be obtained by performing Principal Components Analysis (PCA) upon the plurality of sensor-specific correction matrices, the information that characterizes the manufacturing process comprising a methodology and set of eigenvectors associated for computing the first matrix.

22. The article of claim 19 wherein the parameters include the gain and tilt of the color image sensor, and the information that characterizes the manufacturing process comprises a plurality of correlation coefficients for computing the first matrix.

* * * * *